United States Patent [19]

Keneko et al.

[11] Patent Number: 5,525,639
[45] Date of Patent: Jun. 11, 1996

[54] EXPANDED FOAMED BEAD OF A RUBBER-MODIFIED STYRENE POLYMER

[75] Inventors: Masamichi Keneko; Isao Kiba, both of Suzuka, Japan

[73] Assignee: Asahi Kasei Kogyo Kabushiki Kaisha, Osaka, Japan

[21] Appl. No.: 325,406

[22] PCT Filed: Apr. 26, 1994

[86] PCT No.: PCT/JP94/00700

§ 371 Date: Nov. 2, 1994

§ 102(e) Date: Nov. 2, 1994

[87] PCT Pub. No.: WO94/25516

PCT Pub. Date: Nov. 10, 1994

[30] Foreign Application Priority Data

Apr. 27, 1993 [JP] Japan .................. 5-122143

[51] Int. Cl.$^6$ .................. C08J 9/14; C08J 9/16
[52] U.S. Cl. .................. 521/81; 264/50; 264/53; 521/54; 521/79; 521/139; 521/146; 521/148; 525/316; 525/901
[58] Field of Search .................. 264/50, 53; 521/79, 521/81, 54, 139, 146, 148

[56] References Cited

U.S. PATENT DOCUMENTS

| | | | |
|---|---|---|---|
| 4,594,363 | 6/1986 | Blankenship et al. | 521/64 |
| 4,880,842 | 11/1989 | Kowalski et al. | 521/57 |
| 4,970,241 | 11/1990 | Kowalski et al. | 521/57 |
| 5,229,209 | 7/1993 | Gharapetian et al. | 521/57 |
| 5,369,135 | 11/1994 | Campbell et al. | 521/134 |

FOREIGN PATENT DOCUMENTS

| | | |
|---|---|---|
| 56-67344 | 6/1981 | Japan . |
| 63-175043 | 7/1988 | Japan . |
| 2-311542 | 12/1990 | Japan . |
| 3-182529 | 8/1991 | Japan . |

*Primary Examiner*—Morton Foelak
*Attorney, Agent, or Firm*—Armstrong, Westerman, Hattori, McLeland & Naughton

[57] ABSTRACT

Disclosed is an expanded foamed bead of a rubber-modified styrene polymer, comprising a plurality of closed cells defined by cell walls which constitute a matrix for the bead, wherein each of the cell walls comprises two surfaces separated by a distance equal to the thickness of the cell wall. The matrix comprises: (a) a continuous styrene polymer phase; and (b) a rubber phase dispersed in said continuous styrene polymer phase (a), wherein the rubber phase comprises a plurality of substantially flat, butadiene polymer rubber particles each having at least one styrene polymer particle occluded therein; wherein the flat rubber particles are arranged in lamellar configuration along the thickness of the cell wall and are oriented so that the long axis of a cross-section of each flat rubber particle, as viewed in a cross-section of the cell wall, taken along the thickness of the cell wall, is substantially parallel to the two surfaces of the cell wall, and wherein the cell wall and each flat rubber particle satisfy specific dimensional relationships. The expanded foamed bead of the present invention is not only excellent in its ability to retain a foaming agent gas within the closed cells, but also can advantageously be employed for producing, for example, packaging materials and cushioning materials or packings, as ultimate foamed, molded products, having excellent mechanical properties.

2 Claims, 2 Drawing Sheets

5,525,639

EXPANDED FOAMED BEAD OF A RUBBER-MODIFIED STYRENE POLYMER

BACKGROUND OF THE INVENTION

1. Field of the Invention

The present invention relates to an improved expanded foamed bead of a rubber-modified styrene polymer. More particularly, the present invention is concerned with an expanded foamed bead of a rubber-modified styrene polymer, comprising a plurality of closed cells defined by cell walls which constitute a matrix for the bead. Each of the cell walls comprises two surfaces separated by a distance equal to the thickness of the cell wall. The matrix comprises: (a) a continuous styrene polymer phase; and (b) a rubber phase dispersed in said continuous styrene polymer phase (a), wherein the rubber phase comprises a plurality of substantially flat, butadiene polymer rubber particles each having at least one styrene polymer particle occluded therein; wherein the flat rubber particles are arranged in a specific lamellar configuration along the thickness of the cell wall. The expanded foamed bead of a rubber-modified styrene polymer of the present invention is excellent in its ability to retain a foaming agent gas within the closed cells, and can advantageously be employed for producing, for example, packaging materials and cushioning materials or packings which are improved in resistance to breakage, such as cracking.

2. Discussion of Related Art

Expanded foamed beads of a styrene polymer are molded into various shaped products. During the molding, the expanded foamed beads are further foamed (or expanded) to give an ultimate foamed, molded product. The obtained foamed, molded products are widely employed as, for example, packaging materials and cushioning materials or packings. However, foamed, molded products produced from conventional expanded foamed beads of a styrene polymer are insufficient in resistance to breakage, such as cracking. Therefore, for example, when a foamed, molded product produced from conventional expanded foamed beads of a styrene polymer is used as a cushioning material in packaging an article having a relatively large weight and the packaged article is transported, there is a danger that when the packaged article sustains a jolt or impact during the transportation, the cushioning material suffers cracking. When the packaged article further repeatedly sustains an impact after the cracking of the cushioning material, it is likely that the article is damaged. The cracking of a cushioning material can be prevented by increasing the thickness of the cushioning material. However, when the thickness of a cushioning material to be used in packaging an article is increased, the volume of the resultant package becomes inevitably disadvantageously increased, so that the efficiency of the transportation is lowered.

In order to solve the above problems, it has been proposed to produce an expanded foamed bead from a styrene polymer having a butadiene polymer added thereto, i.e., a rubber-modified styrene polymer.

Unexamined Japanese Patent Application Laid-Open Specification No. 56-67344 discloses an expanded foamed bead of a styrene polymer having non-oriented rubber particles dispersed therein. In the above Japanese Patent document, a foamed, molded product produced from the expanded foamed beads of a rubber-modified styrene polymer disclosed therein is described to have an improved impact strength. However, since the rubber particles dispersed in the styrene polymer are of a non-oriented type, it is difficult for the rubber particles to change in conformity with the formation of cells during the expansion of the rubber-modified styrene polymer. Therefore, during the expansion of the rubber-modified styrene polymer, the rubber particles are likely to be disadvantageously exposed on the surfaces of cell walls or protrude into the cells, thereby adversely influencing the cells. Especially when a highly expanded foamed bead is produced, in which the thickness of cell walls is very small, the exposed or protruding rubber particles are likely to damage the cell walls, so that the retention of a foaming agent gas in the cells is unsatisfactory.

Unexamined Japanese Patent Application Laid-Open Specification No. 63-175043 discloses an expanded foamed bead which is uniform in cell size, and this foamed bead is made from a styrene polymer obtained by polymerizing a solution of a styrene-butadiene block copolymer in a styrene monomer. Unexamined Japanese Patent Application Laid-Open Specification No. 2-311542 discloses an expanded foamed bead improved in the strength of a molded product, in which the bead is made from a styrene polymer obtained by polymerizing a solution of a styrene-soluble rubber in styrene. However, foamed, molded products produced from the expanded foamed beads disclosed in these two Japanese Patent documents are unsatisfactory in resistance to cracking.

The cracking resistance of a foamed, molded product depends on various physical properties of the foamed, molded product, such as compressive strength, tensile strength and elongation, and the structure of cells in the foamed, molded product. These various physical properties of and the structure of cells in the foamed, molded product are influenced by the dispersion morphology of the rubber particles dispersed in the styrene polymer constituting the cell walls in expanded foamed beads used for producing the foamed, molded product.

Unexamined Japanese Patent Application Laid-Open Specification No. 3-182529 discloses an expanded foamed bead of a resin prepared by mechanically blending a high impact polystyrene and a hydrogenated styrenebutadiene block copolymer. However, when a rubber component is mechanically blended with a resin, the dispersion of the rubber component in the resin is likely to be uneven, so that the dispersion of the rubber component in the cell walls of an expanded foamed bead of the resin inevitably becomes uneven. The uneven dispersion of the rubber component in the cell walls is likely to cause breakage of the cell walls due to the presence of large aggregated rubber particles and form a large number of open cells, which allow a foaming agent gas to immediately escape therefrom. The breakage of the cell walls is especially prevalent in the case of a highly expanded foamed bead in which the thickness of the cell walls is small, so that the expanding capability of the expanded foamed bead is lowered. When an expanded foamed bead having a low expanding capability is subjected to molding under foaming, the resultant foamed, molded product inevitably has undesired voids between those beads, which are formed during the molding due to the unsatisfactory expansion of the expanded foamed beads. Such a molded product having voids has a poor appearance.

SUMMARY OF THE INVENTION

In the above situations, the present inventors have made extensive and intensive studies with a view toward developing an expanded foamed bead of a rubber-modified styrene polymer, which is free from the above-mentioned problems of the prior art. As a result of the above studies, with respect to an expanded foamed bead of a rubber-modified styrene polymer, comprising a plurality of closed cells defined by cell walls which constitute a matrix for the bead, it has unexpectedly been found that when the rubber particles dispersed in the matrix are arranged in a lamellar configuration along the thickness of the cell wall and the dimensions of each rubber particle and the thickness of the cell wall satisfy specific relationships, the expanded foamed bead has a high ratio of closed cells and is excellent in the retention of a foaming agent gas. Further, it has surprisingly been found that when this expanded foamed bead is used for producing an ultimate foamed, molded product, the resultant molded product is not only excellent in resistance to cracking, but also has an excellent appearance. Thus, the foamed, molded product can advantageously be employed as, for example, packaging materials and cushioning materials or packings. Based on these novel findings, the present invention has been completed.

It is, accordingly, an object of the present invention to provide an expanded foamed bead of a rubber-modified styrene polymer, which has a high ratio of closed cells even at a high degree of expansion and is excellent in the retention of a foaming agent gas and which can advantageously be employed for producing a foamed, molded product exhibiting not only excellent resistance to cracking but also an excellent appearance.

It is another object of the present invention to provide a process for producing the above-mentioned novel expanded foamed bead of a rubber-modified styrene polymer.

The foregoing and other objects, features and advantages will be apparent to those skilled in the art from the following detailed description and claims taken in connection with the accompanying drawings.

According to the present invention, there is provided an expanded foamed bead of a rubber-modified styrene polymer, comprising a plurality of closed cells defined by cell walls which constitute a matrix for the bead, each of the cell walls comprising two surfaces separated by a distance equal to the thickness of the cell wall, the matrix comprising:

(a) a continuous styrene polymer phase;

and (b) a rubber phase dispersed in the continuous styrene polymer phase (a), comprising a plurality of substantially flat, butadiene polymer rubber particles each having at least one styrene polymer particle occluded therein;

wherein the flat rubber particles are arranged in lamellar configuration along the thickness of the cell wall and are oriented so that the long axis of a cross-section of each flat rubber particle, as viewed in a cross-section of the cell wall, taken along the thickness of the cell wall, is substantially parallel to the two surfaces of the cell wall, and wherein the cell wall and each flat rubber particle satisfy the formulae I and II:

$$0.01 \leq a/c \leq 0.2 \tag{I}$$

and $$10 \leq b/a \leq 70 \tag{II}$$

wherein a represents the thickness (µm) of the rubber particle as measured in terms of the length of the short axis of the cross-section of the rubber particle; b represents the diameter (µm) of the rubber particle as measured in terms of the length of the long axis of the cross-section of the rubber particle, and c represents the thickness (µm) of the cross-section of the cell wall.

Referring now to FIGS. 1 through 3(b), the present invention is described below in detail.

Figure 1:
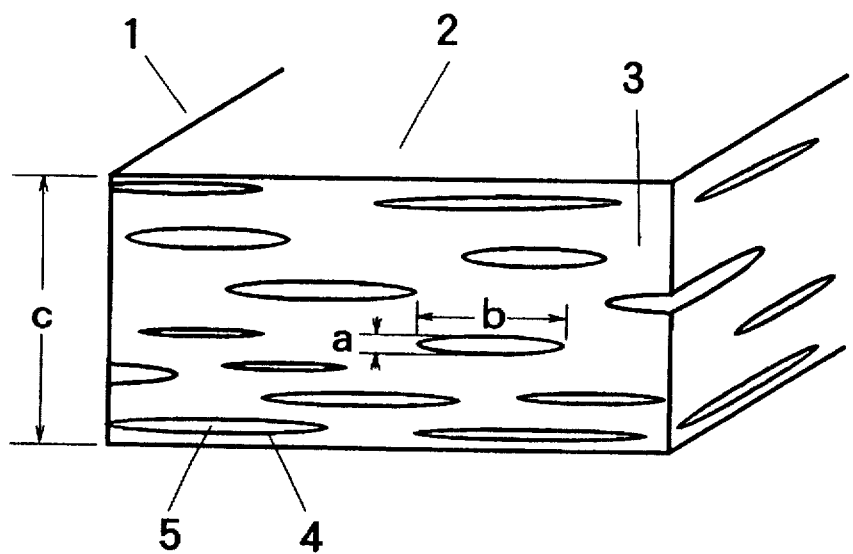
FIG. 1 shows an enlarged diagrammatic view of cross-sections of the cell wall of the expanded foamed bead of the present invention, taken along two planes which extend in the direction of the thickness of the cell wall and are transverse to each other, illustrating the dispersion morphology of substantially flat rubber particles dispersed in a continuous styrene polymer phase in the cell wall in the foamed bead of the present invention.

FIG. 1 shows an enlarged diagrammatic view of cross-sections of the cell wall of the expanded foamed bead of the present invention, taken along two planes which extend in the direction of the thickness of the cell wall and are transverse to each other. The figure illustrates the dispersion morphology of substantially flat rubber particles dispersed in a continuous styrene polymer phase in the cell wall in the foamed bead of the present invention. In FIG. 1, numeral 1 designates a cell wall, numeral 2 designates a surface of cell wall 1; numeral 3 designates continuous styrene polymer phase (a), numeral 4 designates rubber particle (b); numeral 5 designates a styrene polymer particle occluded in rubber particle (b); characters a and b designate the lengths of the short and long axes of the cross-section of rubber particle (b), respectively; and character c designates the thickness of the cross-section of cell wall 1.

Figure 2A:
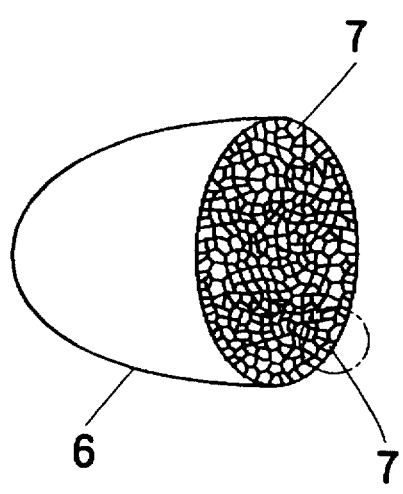
FIG. 2(a) shows an enlarged diagrammatic view of the foamed bead of the present invention with a portion thereof cut away to show a cross-section of the foamed bead.

FIG. 2(a) shows an enlarged diagrammatic view of the foamed bead of a rubber-modified styrene polymer 6 of the present invention with a portion thereof cut away to show a cross-section of the foamed bead. In FIG. 2(a), numeral 6 designates the foamed bead of the present invention and numeral 7 designates a closed cell in the foamed bead.

Figure 2B:
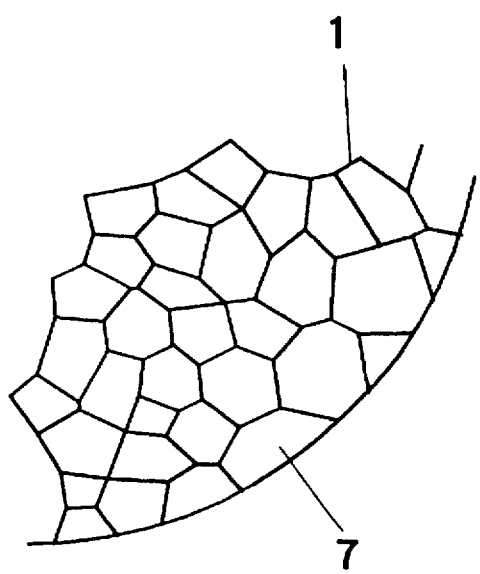
FIG. 2(b) shows an enlarged diagrammatic view of a portion of the cross-section of FIG. 2(a), which is encircled by a broken line in FIG. 2(a)

FIG. 2(b) shows an enlarged diagrammatic view of a portion of the cross-section of FIG. 2(a), which is encircled by a broken line in FIG. 2(a). In FIG. 2(b), numeral 7 designates a closed cell in the foamed bead and numeral 1 designates a cell wall.

The expanded foamed bead 6 of the present invention comprises a plurality of closed cells 7 defined by cell walls 1 which constitute a matrix for the bead 6, each of the cell walls 1 comprising two surfaces 2 (only one surface is shown in FIG. 1) separated by a distance equal to the thickness c of the cell wall 1. The matrix comprises:

(a) a continuous styrene polymer phase 3;

and (b) a rubber phase dispersed in the continuous styrene polymer phase (a) 3, comprising a plurality of substantially flat, butadiene polymer rubber particles 4 each having at least one styrene polymer particle 5 occluded therein.

In general, when a rubber-modified styrene polymer is jolted or impacted, it exhibits a resistance to cracking. The cracking resistance of a rubber-modified styrene polymer is due to the presence of a rubber phase dispersed in a styrene polymer phase, the rubber phase serving to suppress the spread of a cracking caused by the impact on the styrene polymer phase. Therefore, also with respect to a foamed, molded product produced from a foamed bead of a rubber-modified styrene polymer, it is considered that, as in the case of a non-foamed, rubber-modified styrene polymer, a cracking resistance is exhibited due to the presence of the rubber particles in the cell walls as the matrix of the foamed bead, the rubber particles serving to suppress the spread of a cracking caused by the impact on the styrene polymer phase. However, in the foamed, molded product produced from the foamed bead of a rubber-modified styrene polymer, the configuration of the rubber particles, the molecular orientation of the rubber particles, and the molecular orientation of the styrene polymer are completely different from those in the non-foamed, rubber-modified styrene polymer. Therefore, between a non-foamed, rubber-modified styrene polymer and a molded product produced from a foamed bead of the rubber-modified styrene polymer, there is a large difference in the type of dispersion morphology of the rubber phase suitable for improving a cracking resistance.

With respect to a foamed bead of a rubber-modified styrene polymer, the present inventors have for the first time found that when the rubber particles dispersed in the continuous styrene polymer phase are arranged in a specific lamellar configuration along the thickness of the cell wall and the dimensions of each rubber particle and the thickness of the cell wall satisfy specific relationships, the foamed bead has a high ratio of closed cells even at a high degree of expansion or foaming and is excellent in the retention of a foaming agent gas, and a molded product produced therefrom is not only excellent in resistance to cracking, but also has an excellent appearance.

In the present invention, as shown in FIG. 1, the flat rubber particles 4 are arranged in lamellar configuration along the thickness of the cell wall 1 and are oriented so that the long axis of a cross-section of each flat rubber particle 4, as viewed in a cross-section of the cell wall 1, taken along the thickness of the cell wall 1, is substantially parallel to the two surfaces 2 of the cell wall 1,-and the cell wall 1 and each flat rubber particle 4 satisfy the formulae I and II:

$$0.01 \leq a/c \leq 0.2 \quad (I),$$

and $$10 \leq b/a \leq 70 \quad (II)$$

wherein a represents the thickness (μm) of the rubber particle as measured in terms of the length of the short axis of the cross-section of the rubber particle; b represents the diameter (μm) of the rubber particle as measured in terms of the length of the long axis of the cross-section of the rubber particle, and c represents the thickness (μm) of the cross-section of the cell wall.

In the present invention, the aspect ratio b/a [i.e., the ratio of the diameter (μm) of the rubber particle, as measured in terms of the length of the long axis of the cross-section of the rubber particle, to the thickness (μm) of the rubber particle as measured in terms of the length of the short axis of the cross-section of the rubber particle], which represents the flatness of a cross-section of a flat rubber particle, as viewed in a cross-section of the cell wall, taken along the thickness of the cell wall, is a value obtained as an average of the values of aspect ratio b/a of 20 rubber particles randomly selected in the cross-section of the cell wall.

As mentioned above, in the present invention, the ratio b/a is in the range from 10 to 70. The ratio b/a is preferably in the range from 10 to 40. When the ratio b/a is less than 10, the rubber particles tend to be exposed on the surfaces of the cell walls, so that the retention of a foaming agent gas in the cells is lowered. On the other hand, when the ratio b/a is larger than 70, the thickness of the rubber particle is excessively small relative to the size of the surface of the rubber particle, resulting in a lowering of the ability of the rubber particles to suppress the spread of a crack through the styrene polymer phase, so that the cracking resistance of an ultimate foamed, molded product is lowered.

In the present invention, the ratio a/c [i.e., the ratio of the thickness (μm) of the rubber particle, as measured in terms of the length of the short axis of the cross-section of the rubber particle, to the thickness (μm) of the cross-section of the cell wall] is a value obtained as an average of the values of ratio a/c between the cross-section of the cell wall and each of the 20 rubber particles randomly selected in the cross-section of the cell wall.

As mentioned above, in the present invention, the ratio a/c is in the range from 0.01 to 0.2. The ratio a/c is preferably in the range from 0.01 to 0.1. When the ratio a/c is less than 0.01, the thickness of the rubber particle is too small relative to the thickness of the cell wall, resulting in a lowering of the ability of the rubber particles to suppress the spread of a crack through the styrene polymer phase, so that the cracking resistance of an ultimate foamed, molded product is lowered. On the other hand, when the ratio a/c is larger than 0.2, the rubber particles tend to be exposed on the surfaces of the cell walls, so that the retention of a foaming agent gas in the cells is lowered.

The thickness of the cross-section of the cell wall is preferably in the range from 0.2 to 10 μm, more preferably from 0.3 to 5 μm.

In the present invention, the number of the flat, butadiene polymer rubber particles which are arranged in lamellar configuration along the thickness of the cell wall, is preferably from 2 to 20, more preferably from 2 to 10. The flat particles are oriented so that the long axis of a cross-section of each flat rubber particle, as viewed in a cross-section of the cell wall, taken along the thickness of the cell wall, is substantially parallel to the two surfaces of the cell wall. When the flat rubber particles are not oriented in the above-described manner, the ability of the flat rubber particles to suppress the spread of a crack is low.

The values a, b and c can be measured by the following method:

A portion of an expanded foamed bead is cut away to expose a cross-section thereof; the foamed bead having a cross-section exposed is immersed in an aqueous 2% osmium tetrachloride solution for 24 hours to thereby stain the cross-section, followed by a washing with distilled water; the foamed bead is embedded in an epoxy resin which can be cured at room temperature; an ultrathin slice is cut out from the cross-section of the embedded foamed bead, using an ultramicrotome; and an electron photomicrograph of the ultrathin slice is taken; and the values a, b and c are measured on the electron photomicrograph.

The configuration of a flat rubber particle as viewed in a direction perpendicular to the surfaces of the cell wall is not specifically limited and can be varied, for example, a circular, elliptic or polygonal configuration.

There is no particular limitation with respect to the configuration of the foamed bead of the present invention. Examples of morphologies of the foamed bead include a sphere, a cylinder, and an ellipsoid.

In the present invention, it is preferred that the foamed bead have an apparent density of from 0.014 to 0.100 g/cm³. It is more preferred that the apparent density be from 0.014 to 0.07 g/cm³. When the apparent density is less than 0.014 g/cm³, the ratio of closed cells of the foamed bead is low, and also the strength of an ultimate foamed, molded product is low. On the other hand, when the apparent density is larger than 0.100 g/cm³, the amount of the rubber-modified styrene polymer used is disadvantageously increased, so that the cost is increased.

In the foamed bead of the present invention, the fact that the flat rubber particles are arranged in specific lamellar configuration along the thickness of the cell wall means that in the course of the foaming of the rubber-modified styrene polymer toward the formation of the foamed bead, i.e., in the course of the development and expansion of cells, which causes the cell walls to be stretched, the dispersed rubber particles are appropriately oriented in conformity with the stretching of the continuous styrene polymer phase. The specific lamellar configuration of the arrangement of the flat rubber particles can be attained by appropriately selecting a relationship between the viscoelasticity of the continuous styrene polymer phase and that of the rubber phase. The viscoelasticity of a rubber is varied depending on the cross-linking degree, the molecular weight and the like. The viscoelasticity of a styrene polymer is varied depending on the molecular weight and the like. From the viewpoint of attaining an appropriate relationship between the viscoelasticity of the continuous styrene polymer phase and that of the rubber phase, in the foamed bead of the present invention, it is preferred that the continuous styrene polymer phase (a) have an intrinsic viscosity of from 0.6 to 0.9 dl/g as measured in toluene at 30° C., and the matrix have a gel moiety with a swelling index of from 6.5 to 13.5, the gel moiety being defined as an extraction residue of the extraction of the foamed bead with toluene at 25° C., the swelling index of the gel moiety being defined as a value (B) obtained according to the formula III:

$$B=(W_1-W_2)/W_2 \qquad (III)$$

wherein $W_1$ represents the weight of the gel moiety swelled with toluene at 25° C., and $W_2$ represents the weight of the gel moiety obtained by drying the swelled gel moiety.

The "intrinsic viscosity" mentioned herein means a viscosity obtained by extrapolating a curve based on the reduced viscosity against the concentration to infinite dilution. The "gel moiety" mentioned herein corresponds to the rubber phase.

When the intrinsic viscosity of the continuous styrene polymer phase is less than 0.6, the molecular weight of the continuous styrene polymer phase is too low, so that the flowability of the continuous styrene polymer phase becomes large and the strength of the continuous styrene polymer phase is lowered. When the intrinsic viscosity of the continuous styrene polymer phase is larger than 0.9, it is difficult to prepare an appropriate rubber-modified styrene polymer, using such a styrene polymer. It is more preferred that the intrinsic viscosity of the continuous styrene polymer phase be from 0.65 to 0.85.

When the swelling index of the gel moiety is less than 6.5, the cross-linking degree of the gel moiety is too high, so that the thickness of each rubber particle is less likely to become appropriately small in thickness in the course of the formation of a foamed bead. On the other hand, when the swelling index of the gel moiety is larger than 13.5, the cross-linking degree of the gel moiety is too low, the elongation becomes insufficient, so that the cracking resistance is poor. It is more preferred that the swelling index of the gel moiety be from 8.5 to 12.5.

In the present invention, the cross-linking of the rubber phase occurs during the production of the rubber-modified styrene polymer. Illustratively stated, after a solution of a rubber in a styrene monomer is polymerized, the resultant reaction mixture is introduced to a volatilization apparatus which is heated (at 150° C. or more) in vacuo, to thereby remove the unreacted styrene, thus obtaining a rubber-modified styrene polymer. In this operation for removing the unreacted styrene, the rubber phase undergoes cross-linking by heat.

In the foamed bead of the present invention, it is preferred that the flat rubber particle be comprised of at least one butadiene polymer selected from the group consisting of a polybutadiene and a styrene-butadiene block copolymer.

It is also preferred that the continuous styrene polymer phase (a) be comprised of at least one styrene polymer selected from the group consisting of a polystyrene and a styrene copolymer having a styrene content of 50% by weight or more.

The rubber-modified styrene polymer used in the present invention is a composition in which butadiene polymer rubber particles are dispersed in a styrene polymer. In general, dispersion of butadiene polymer rubber particles in a styrene polymer can be attained by either (1) a method in which a butadiene polymer rubber is dissolved in a styrene monomer or a mixture of a styrene monomer with another monomer, and the resultant solution is polymerized, thereby obtaining a styrene polymer having-rubber particles dispersed therein; or (2) a method in which a butadiene polymer rubber is mechanically blended with a styrene polymer. In the present invention, the dispersing method (1) above (non-mechanical dispersion) can be suitably employed since rubber particles can be evenly dispersed. In the present invention, it is not preferred to use the dispersing method (2) (mechanical dispersion) since when a rubber component is mechanically dispersed, problems occur such that a dispersed rubber particle is likely to assume an irregular shape, the dispersion of rubber particles is likely to be uneven and a microdispersion is less likely to be achieved.

In the present invention, when the dispersing method (1) (non-mechanical dispersion) is used, in the resultant rubber-modified styrene polymer, each rubber particle has either (1) a core-shell structure wherein a single particle of a styrene polymer is occluded as a core in the rubber particle which constitutes a shell, or (2) a structure wherein at least two styrene polymer particles are occluded in the rubber particle (the socalled "salami" structure). In rubber-modified styrene polymers to be used in the present invention, the rubber phase is comprised of rubber particles having a core-shell structure, a salami structure, or a combination thereof.

In the rubber-modified styrene polymer, it is preferred that the rubber phase be comprised of rubber particles each having a diameter of 1 μm or less and having a core-shell structure. In this case, it is more preferred that each (core-shell structure) rubber particle have a diameter of from 0.1 to 1 μm, more preferably from 0.1 to 0.5 μm. In the rubber-modified styrene polymer to be used in the present invention, it is also preferred that the dispersed rubber phase be comprised of a mixture of 80% by weight or more, based on the weight of the rubber phase, of rubber particles each having a diameter of 1 μm or less and having a core-shell structure wherein a single particle of a styrene polymer is occluded as a core in the rubber particle which constitutes a shell, and 20% by weight or less, based on the weight of the dispersed rubber phase, of rubber particles each having a salami structure wherein at least two styrene polymer particles are occluded in each rubber particle. In this case, it is more preferred that each rubber particle having a core-shell structure have a diameter of from 0.1 to 1 μm, more preferably from 0.1 to 0.5 μm.

With respect to the rubber-modified styrene polymer to be used in the present invention, when a rubber particle has a core-shell structure and has a diameter of 1 μm or less, even dispersion of flat rubber particles in the cell walls of a foamed bead can be obtained. Especially in the case of the production of a highly expanded foamed bead, in which the thickness of a cell wall is small, rubber particles each having a diameter as small as 1 μm or less are suitable for facilitating even dispersion of flat rubber particles in the cell walls of a foamed bead. On the other hand, with respect to rubber particles each having a salami structure wherein at least two styrene polymer particles are occluded in each rubber particle, the particle diameter thereof tends to be more than 1 μm, so that it is somewhat difficult to obtain an even dispersion of flat rubber particles in the cell walls of a foamed bead. However, in the present invention, rubber particles each having a salami structure may be used alone or in combination with rubber particles each having a core-shell structure.

The configuration of each rubber particle in the non-foamed rubber-modified styrene polymer to be used in the present invention is not particularly limited. Examples of configurations of each rubber particle in the non-foamed rubber-modified styrene polymer include a sphere, an ellipsoid, and an irregular shape.

With respect to the foamed bead of the present invention, it is preferred that each flat rubber particle have a core-shell structure wherein a single particle of a styrene polymer is occluded as a core in the rubber particle which constitutes a shell. With respect to the foamed bead of the present invention, it is also preferred that the dispersed rubber phase be comprised of a mixture of 80% by weight or more, based on the weight of the dispersed rubber phase, of flat rubber particles each having a core-shell structure wherein a single particle of a styrene polymer is occluded as a core in the rubber particle which constitutes a shell, and 20% by weight or less, based on the weight of the dispersed rubber phase, of flat rubber particles each having a salami structure wherein at least two styrene polymer particles are occluded in each rubber particle.

There is no particular limitation with respect to the weight of the foamed bead of the present invention. However, it is preferred that the average weight of the foamed bead be from 0.2 to 2 mg, more preferably from 0.4 to 1.2 mg. Herein, the term "average weight of the foamed bead" means a value obtained as an average weight of 200 foamed beads randomly selected.

In another aspect of the present invention, there is provided a process for producing an expanded foamed bead of a rubber-modified styrene polymer of the present invention, which comprises:

(1) melt-kneading a rubber-modified styrene polymer with a foaming agent in an extruder to form a molten mixture therein, the rubber-modified styrene polymer comprising:

(a) a continuous styrene polymer phase;

(b) a rubber phase dispersed in the continuous styrene polymer phase (a), comprising a plurality of butadiene polymer rubber particles each having at least one styrene polymer particle occluded therein, wherein the continuous styrene polymer phase (a) has an intrinsic viscosity of from 0.6 to 0.9 dl/g, and the rubber-modified styrene polymer has a gel moiety with a swelling index of from 6.5 to 13.5, the gel moiety being defined as an extraction residue of the extraction of the rubber-modified styrene polymer with toluene at 25° C., the swelling index of the gel moiety being defined as a value (B) obtained according to the formula III:

$$B=(W_1-W_2)/W_2 \quad \text{(III)}$$

wherein $W_1$ represents the weight of the gel moiety swelled with toluene at 25° C., and $W_2$ represents the weight of the gel moiety obtained by drying the swelled gel moiety, (2) retaining the molten mixture at 130° C. or higher for 15 minutes or more under a pressure of from 50 to 300 kg/cm$^2$G in the extruder to thereby impregnate the rubber-modified styrene polymer with the foaming agent, (3) extruding the resultant molten, impregnated rubber-modified styrene polymer into water, followed by cutting of the extruded polymer, and (4) heating the cut, impregnated rubber-modified styrene polymer.

The rubber-modified styrene polymer to be used for producing an expanded foamed bead of the present invention can be prepared by a customary method, such as a bulk polymerization method, a combined method of bulk polymerization and suspension polymerization, or an irradiation polymerization method.

For example, the bulk polymerization method can be practiced as follows:

First, a butadiene polymer rubber is dissolved in a styrene monomer and the resultant solution is subjected to polymerization at an elevated temperature while stirring.

Examples of butadiene polymer rubbers include polybutadienes (including low-cis polybutadiene having a cis-1,4 addition content of 35%, a trans-1,4 addition content of 52% and a 1,2 addition content of 13%; and high-cis polybutadiene having a cis-1,4 addition content of 90 to 98%, a trans-1,4 addition content of 1 to 4% and a 1,2 addition content of 1 to 6%), a styrene-butadiene copolymer (a random SBR and a block SBR), a polyisoprene, and a butadiene-isoprene block copolymer. Of these examples, polybutadiene and a styrene-butadiene block copolymer are preferred. These butadiene polymer rubbers can be employed alone or in combination.

Examples of styrene monomers include styrene; styrene derivatives in which an alkyl group is attached as a substituent to the benzene nucleus, such as o-methylstyrene, p-methylstyrene, m-methylstyrene, 2,4-dimethylstyrene and ethylmethylstyrene; α-alkylsubstituted styrene derivatives, such as α-methylstyrene; and styrene derivatives in which a halogen atom is attached as a substituent to the benzene nucleus, such as o-chlorostyrene. These styrene monomers can be used alone or in combination.

At least one monomer other than a styrene monomer may be employed as a comonomer. Examples of comonomers include acrylonitrile, methyl methacrylate, and maleic anhydride.

When the polymerization reaction is conducted, a solvent may be used. Examples of solvents include aromatic hydrocarbons, such as toluene, xylene, and ethylbenzene. These solvents can be used alone or in combination.

The polymerization reaction can be effected simply by heating at a temperature of from 100° to 180° C. without using a polymerization initiator. However, for obtaining a polymer having a high quality, a polymerization initiator may preferably be employed. Examples of initiators include peroxyketals, such as 1,1-bis(t-butylperoxy)cyclohexane; dialkyl peroxides, such as di-t-butyl peroxide; diaryl peroxides, such as benzoyl peroxide; peroxydicarbonates; peroxyesters; ketone peroxides; and hydro peroxides.

A chain transfer agent may be used for the polymerization reaction. Examples of chain transfer agents include α-methylstyrene dimer; mercaptans, such as n-dodecyl mercaptan, t-dodecyl mercaptan, 1-phenylbutene- 2-fluorene, dipentene and chloroform; terpenes; and halides.

The reaction temperature is generally in the range from 50° to 170° C., preferably from 90° to 155° C. The reaction temperature may be constant or may be gradually elevated during the reaction. When a gradual elevation of reaction temperature is to be conducted, the temperature may, for example, be elevated stepwise in a manner such that the temperature is elevated 2 or more times at a temperature elevation rate of 0.2° to 2° C./minute, preferably 0.4° to 1.5° C./minute. The reaction is continued until a desired conversion has been achieved. After completion of the reaction, the unreacted monomer and any solvent used are removed by, for example, heating in vacuo to obtain a rubber-modified styrene polymer.

The obtained rubber-modified styrene polymer is continuously supplied to an extruder. The supplied polymer is heat-melted and extruded into strands through orifices provided at a die of the extruder. The extruded strands are immediately cooled in a water bath, while being received between upper and lower drive rolls, which send the cooled polymer strands to a rotary cutter. The rotary cutter cuts the polymer strands in a transverse direction at predetermined intervals, thereby obtaining polymer beads.

For forming dispersed rubber particles having a core-shell structure wherein a single particle of a styrene polymer is occluded as a core in the rubber particle, it is preferable to use, for example, a styrene-butadiene block copolymer as a rubber component. That is, for preparing a feed stock for polymerization, first, a styrene-butadiene block copolymer is dissolved in a styrene monomer and then, the styrene monomer is polymerized (see Example 1). When the styrene-butadiene block copolymer is dissolved in the styrene monomer, the styrene polymer blocks of the block copolymer bind together, whereas the butadiene polymer blocks bind together. Since the continuous phase being formed by polymerization is of a styrene polymer, the styrene polymer blocks bound together are unified into the continuous polystyrene phase, while a portion of the styrene monomer enters into the butadiene polymer blocks bound together, so that the butadiene polymer blocks together form a shell around a core formed of a single particle of the styrene polymer.

In general, for efficiently forming dispersed rubber particles having a core-shell structure, there can be used, for example, a method in which the affinity of the butadiene polymer to the styrene polymer is enhanced; a method in which the viscosity of a feed stock solution to be used for polymerization is appropriately adjusted; a method in which the rate and time of stirring the reaction system during polymerization are appropriately adjusted; and a method in which uniform stirring of the reaction system is conducted. That is, formation of dispersed rubber particles having a core-shell structure can be achieved by appropriately choosing reaction conditions for producing a rubber-modified styrene polymer. With respect to the details of the appropriate conditions, reference can be made to, for example, Unexamined Japanese Patent Application Laid-Open Specification No. 60-130613.

On the other hand, for forming dispersed rubber particles having a salami structure wherein at least two styrene polymer particles are occluded in each rubber particle, it is preferable to use a polybutadiene as a rubber component. That is, for preparing a feed stock solution for polymerization, first, a polybutadiene is dissolved in a styrene monomer and then, the styrene monomer is polymerized (see Example 2). In this case, since there is present only a polybutadiene in the continuous phase of the styrene polymer, the polybutadiene forms particles while a portion of the styrene monomer enters into polybutadiene particles being formed, so that a plurality of styrene polymer particles are occluded in each butadiene rubber particle.

As an alternative method for producing a rubber-modified styrene polymer, a combined method of bulk polymerization and suspension polymerization can also be utilized. In this method, a bulk polymerization is conducted in the early stage, and a suspension polymerization is conducted in the later stage. That is, a butadiene polymer is dissolved in a styrene monomer to obtain a solution for polymerization. Using this solution, first, 10 to 40% by weight of the styrene monomer are polymerized with the butadiene polymer in the same manner as in the above-mentioned bulk polymerization, to thereby obtain a mixture of a partially polymerized styrene polymer and the remaining styrene monomer. The obtained mixture is stirred and dispersed in an aqueous medium in the presence of a suspension stabilizer and a surfactant, and subsequently a suspension polymerization is allowed to proceed in the later stage. After completion of the suspension polymerization, the resultant rubber-modified styrene polymer is washed and dried. If desired, the obtained polymer can be formed into pellets or a powder.

Additives can be added to the rubber-modified styrene polymer, such as a dye, a pigment, a lubricant, a filler, a releasing agent, a plasticizer, an antistatic agent, a foam-nucleating agent and a stabilizer to ultraviolet rays, as well known in the art.

In the present invention, an expandable, foamable polymer particle, an expanded foamed bead of a rubber-modified styrene polymer of the present invention and an ultimate foamed, molded product can be obtained as follows:

The above-obtained rubber-modified styrene polymer is impregnated with a foaming agent. For impregnating a rubber-modified styrene polymer with a foaming agent and molding the resultant impregnated polymer with in situ foaming and expansion, there can be advantageously used a so-called extrusion/impregnation method.

In the extrusion/impregnation method, the rubber-modified styrene polymer is heat-melted in an extruder. To the resultant molten styrene polymer, a volatile foaming agent is introduced under pressure through a feeding line which is connected to the extruder. The rubber-modified styrene polymer is melt-kneaded with the foaming agent in the extruder. Then, the resultant molten mixture is retained in the extruder for 15 minutes or more, preferably 20 minutes or more and, subsequently, the molten mixture is extruded into strands through orifices provided at a die of the extruder.

The extruded strands are immediately cooled in a water bath, while being received between upper and lower drive rolls, which send the cooled polymer strands to a rotary cutter. The rotary cutter cuts the polymer strands in a transverse direction at predetermined intervals, thereby obtaining polymer beads. Alternatively, the molten mixture can be extruded into water, and the extrudate can be cut in the water immediately upon extrusion. This method is preferred because the pieces obtained by cutting can easily become spherical.

For achieving a good balance in the expansion of the rubber-modified styrene polymer between the viscoelasticity of the continuous styrene polymer phase and the viscoelasticity of the dispersed rubber phase so that the specific dispersion morphology of the rubber particles (wherein the rubber particles are dispersed in substantially flat forms) can be obtained, it is effective to retain the molten mixture of the rubber-modified styrene polymer and the foaming agent in the extruder at 130° C. or higher for 15 minutes or more, preferably for 20 minutes or more under a pressure of from 50 to 300 kg/cm$^2$G, preferably from 100 to 200 kg/cm$^2$G. The reason for this has not yet been elucidated, but presumably resides in that both the rubber component and the styrene polymer are sufficiently and uniformly impregnated with the foaming agent to appropriately plasticize the rubber component.

When the pressure is higher than 300 kg/cm$^2$G, it is necessary to increase the strength of the extruder with respect to the pressure resistance, so that the cost for the extruder becomes high.

On the other hand, when the pressure is lower than 50 kg/cm$^2$G, the rate of the extrusion is decreased, leading to a lowering of the productivity.

The retention time of the molten mixture of a rubber-modified styrene polymer and a foaming agent under the above-mentioned specific conditions can be regulated by providing a conduit between an extruder and a die thereof and appropriately adjusting the length of the conduit. Alternatively, the retention time can be regulated by appropriately adjusting the rate of the extrusion.

On the other hand, foaming agent-impregnated, rubber-modified styrene polymer beads to be used for producing foamed beads of the present invention can also be obtained by a so-called suspension/impregnation method. In this method, beads of the rubber-modified styrene polymer are dispersed in an aqueous medium in the presence of a suspension stabilizer and a surfactant while agitating. A foaming agent is introduced to the aqueous medium under a pressure of, for example, about 50 kg/cm$^2$G, while heating at room temperature to about 120° C., to thereby impregnate the rubber-modified styrene polymer with the foaming agent. In this method, it is important to have a satisfactorily long impregnation time.

Examples of volatile foaming agents to be used for producing expandable, foamable pellets or particles of the present invention, include aliphatic hydrocarbons, such as propane, butane, pentane, hexane, heptane and petroleum ether; alicyclic hydrocarbons, such as cyclopentane and cyclohexane; and halogenated hydrocarbons, such as methyl chloride, ethyl chloride, methyl bromide, dichlorodifluoromethane, 1,2-dichlorotetrafluoroethane and monochlorotrifluoroethane.

The foamable pellets or particles of a rubber-modified styrene polymer impregnated with a foaming agent can be expanded and foamed using steam by means of a conventional machine used for producing foamed polystyrene beads to obtain expanded foamed beads of a rubber-modified styrene polymer. In the operation for expansion and foaming of the foamable pellets or particles, heating is conducted at a temperature of from 95° to 104° C. for 10 to 150 seconds, preferably for 20 to 60 seconds.

As an alternative method of expanding pellets or particles of a rubber-modified styrene polymer impregnated with a foaming agent, there can be employed a method in which the pellets or particles are subjected to annealing in warm water before the heating for expansion and foaming, so that expanded foamed beads, each having a uniform cell size, can be obtained.

The expanded foamed beads of a rubber modified styrene polymer of the present invention can be subjected to molding by means of a conventional molding machine for producing foamed, molded polystyrene products, in which the expanded foamed beads are fusion-unified with in situ expansion and foaming, so that an ultimate foamed, molded product can be obtained.

BEST MODE FOR CARRYING OUT THE INVENTION

The present invention will be described in greater detail with reference to the following Examples and Comparative Examples, which should not be construed as limiting the scope of the present invention. In the Examples and Comparative Examples, the properties of each of a rubber-modified styrene polymer, a foamed bead of a rubber-modified styrene polymer and a foamed, molded product thereof are measured as follows:

(1) Apparent density of an expanded foamed bead of a rubber-modified styrene polymer:

The term "apparent density" is defined as a value obtained by dividing the weight of the expanded foamed bead by the volume of the expanded foamed bead.

The apparent density of an expanded foamed bead is obtained as follows:

About 5 g of expanded foamed beads of a-rubber-modified styrene polymer are weighed with an accuracy on the order of 0.01 g. Separately, from 50 to 100 cm$^3$ of water is poured into a 200 cm$^3$ glass measuring cylinder having a minimum graduation unit of 1 cm$^3$. A pushing tool is submerged in the water, which is constructed of a circular wire net having a diameter slightly smaller than the inner diameter of the cylinder and a wire (having a length of from 15 to 30 cm) vertically extended from the center of the net. Then, the water level is read to obtain level H$_1$ (cm$^3$). Subsequently, the pushing tool is removed. The above-weighed beads are placed in the cylinder, and then, the beads are completely submerged in the water by means of the pushing tool to obtain level H$_2$ (cm$^3$). The apparent density of the bead, ρ (g/cm$^3$), is obtained according to the following formula:

$$\tau = W/(H_2 - H_1)$$

wherein W represents the total weight of the foamed beads, H$_1$ represents the water level before the foamed beads are placed in the cylinder, and H$_2$ represents the water level after the foamed beads are completely submerged in the water.

(2) Bulk density of a foamed, molded product:

A bulk density of a foamed, molded product, D (g/cm$^3$), is calculated by the following formula in accordance with JIS K6767:

$$D = G/V$$

where G represents the weight of a foamed, molded product sample, and V represents the volume of the foamed, molded product sample.

The weight [G(g)] and volume [V(cm$^3$)] of a foamed, molded product sample are obtained as follows:

A portion of a foamed, molded product is cut out to obtain a rectangular parallelopiped as a sample. The weight [G(g)]

of the rectangular parallelo-piped (weight of the sample) is measured, and then the length, width and height of the rectangular parallelopiped are measured (in cm), by means of a measuring tool as described in JIS K6767 with an accuracy as also described in JIS K6767. The volume of the foamed, molded product sample is obtained by calculating a product of the length multiplied by the width and height.

(3) Ratio of closed cells:

About 24 cm$^3$ [as measured by submerging foamed beads in water in the manner described in item (1) above] of foamed beads (whose apparent density is known) is subjected to measurement with respect to a sum of the volume of the matrix of the foamed bead and the total inner volume of the closed cells in the foamed beads by using an air comparison picnometer (Model 930 manufactured and sold by Toshiba-Beckman Co., Ltd, Japan). The ratio of closed cells [S(%)] of the foamed beads is calculated by the following formula (ASTM D-2856):

$$S = 100 \cdot (V_x - W/\tau)/(V_a - W/\tau) \ (\%)$$

wherein $V_x$ represents a sum of the volume of the matrix of the foamed bead and the total inner volume of the closed cells in the foamed bead, $V_a$ represents a sum of the volume of the matrix of the foamed bead, the total inner volume of the closed cells in the foamed bead and the total inner volume of the open cells in the foamed bead, W represents the weight of the foamed bead, and $\tau$ represents the density of the matrix.

Evaluation is made according to the following criterions:

| Mark | Ratio of closed cells |
|---|---|
| ⊙ | S (%) ≧ 90% |
| ○ | 80% ≦ S (%) < 90% |
| Δ | 80% ≦ S (%) < 85% |
| x | S (%) < 80% |

(4) Average particle diameter of rubber particles:

An ultrathin section of a rubber-modified styrene polymer is prepared. The prepared ultrathin section is stained with osmium tetraoxide and, then, subjected to electron microscopy. On the obtained photograph, 500 rubber particles are randomly selected and the respective diameters of the rubber particles are measured. The average particle diameter [$\bar{D}(\mu m)$] of the rubber particles is calculated according to the following formula:

$$\bar{D} = \Sigma n_i \cdot D_i / \Sigma n_i \ (i=1, 2, \ldots)$$

wherein $n_i$ represents the number of rubber particles having a diameter $D_i$, and $D_i$ represents the diameter (with an accuracy on the order of 0.1 μm).

When a rubber particle is non-circular in cross-section, diameter $D_i$ is defined as $(L_1+L_2)/2$ wherein $L_1$ is a major diameter of the particle, and $L_2$ is a minor diameter of the particle. The terminology "minor diameter" used herein means the maximum of distances between opposite points on the periphery of the non-circular shape, wherein the opposite points are positioned on opposite sides of a longitudinal axis of the non-circular shape (which is defined as a central line extending along the length of the non-circular shape), and the terminology "major diameter" used herein means the maximum of distances between opposite points on the periphery of the non-circular shape, wherein the opposite points are positioned on opposite sides of a short axis of the non-circular shape (which is defined as a central line extending in a direction perpendicular to the above-mentioned longitudinal axis).

(5) Intrinsic viscosity (dl/g) of the continuous styrene polymer phase of an expanded foamed bead of a rubber-modified styrene polymer:

To 1 g of expanded foamed beads of a rubber-modified styrene polymer is added a mixed solvent of 18 ml of methyl ethyl ketone and 2 ml of methanol and then, the resultant mixture is shaken at 25° C. for 2 hours and further subjected to centrifugation at 5° C. and 18,000 rpm for 30 minutes to obtain a supernatant. Methanol is added to the obtained supernatant to precipitate the continuous resin phase component. Then, the obtained precipitate is dried.

0.1 g of the thus obtained precipitate is dissolved in toluene to thereby obtain a 0.5 g/dl solution. 10 ml of the thus obtained solution is applied to a Cannon-Fenske viscometer (manufactured and sold by Canon, Inc., Japan), and a period of time [$t_1$(sec)] necessary for all of the solution to downwardly flow out is measured at 30° C. Separately, by using the same viscometer, a period of time [$t_0$(sec)] necessary for 10 ml pure toluene to downwardly flow out is measured at 30° C. The reduced viscosity, $\eta_{sp}/C$ of the 0.5 g/dl, is calculated according to the following formula:

$$\eta_{sp}/C = (t_1 - t_0)/(t_0 \cdot C)$$

wherein C represents the styrene polymer concentration (g/dl) of the solution.

Further, a 1.0 g/dl toluene solution and a 1.5 g/dl toluene solution, each having the above-obtained precipitate dissolved therein, are prepared. With respect to these two solutions, reduced viscosities are obtained in the same manner as mentioned above. The intrinsic viscosity [η] is obtained by extrapolating a plot of $\eta_{sp}/C$ against C to infinite dilution (C=0).

(6) Swelling index of the gel moiety of the foamed bead:

0.5 g of foamed beads is immersed in 30 ml of toluene at 25° C. for 24 hours and then shaken for 5 hours to obtain a mixture. The obtained mixture is subjected to centrifugation at 5° C. and 18,000 rpm for 1 hour to thereby separate the mixture into a supernatant and a precipitate. The supernatant is removed by decantation to obtain a residue. Thirty ml of toluene is added to the obtained residue and then shaken at 25° C. for 1 hour. The resultant mixture is subjected to centrifugation at 5° C. and 18,000 rpm for 1 hour to thereby separate the mixture into a supernatant and a precipitate. The supernatant is removed by decantation to obtain a residue. The obtained residue is weighed to obtain a weight ($W_1$). Subsequently, the residue is vacuum-dried. The weight ($W_2$) of the dried residue is measured. The swelling index, (B), is calculated according to the following formula:

$$B = (W_1 - W_2)/W_2$$

(7) Retention of a foaming agent:

Foamable beads are foamed with expansion to obtain expanded foamed beads each having an apparent density of 0.033 g/cm$^3$. The obtained foamed beads are allowed to stand in a drying container at 23° C. for about 24 hours to thereby remove the moisture present in the surface and inside of the foamed beads. The thus dried foamed beads are subjected to measurement of the retention of the foaming agent in the foamed beads.

The retention of a foaming agent in an expanded, foamed bead of the present invention can be measured as follows:

About 5 g of expanded foamed beads are weighed with an accuracy on the order of 0.01 g. The weighed beads are placed in a glass flask having an opening at a top thereof and having a volume of 1000 cm$^3$. The glass flask having the beads placed therein is weighed with an accuracy on the order of 0.01 g and then put into a vacuum-deaerating apparatus which is controlled at 180° C. to thereby deaerate at 60 mmHg (absolute pressure) for 60 minutes. Then, the deaerated glass flask having the beads placed therein is taken out and then allowed to stand at room temperature and further subjected to measurement of the weight. The content [G (g/100 g of the expanded foamed beads)] of the foaming agent in the foamed bead is obtained according to the following formula:

$$G=100 \cdot (G_1-G_2)/(G_1-G_0)$$

wherein $G_0$ represents the weight of the glass flask; $G_1$ represent the weight of the glass flask having the beads placed therein, before vacuum-deaeration; and $G_2$ represents the weight of the glass flask having the beads placed therein, after vacuum-deaeration.

The content (g/100 g of expanded foamed beads) of the foaming agent in the expanded foamed beads is measured every 3 hours. Thus, there is obtained the half-period [$t_{1/2}$ (hr)] necessary for the 4 g of the foaming agent contained in 100 g of the beads to become a half (2 g). This half-period is taken as the ability of expanded foamed beads to retain the foaming gas (retention of foaming gas).

With respect to three types of foamed beads having apparent densities of 0.018, 0.023 and 0.040 g/cm³, respectively, measurements are done.

Evaluation is made according to the following criterions:

| Mark | Half-period [$t_{1/2}$ (hr)] |
|---|---|
| ⊙ | $t_{1/2} \geq 100$ hr |
| ○ | 75 hr $\leq t_{1/2} < 100$ hr |
| Δ | 60 hr $\leq t_{1/2} < 75$ hr |
| x | $t_{1/2} < 60$ hr |

(8) Appearance of a foamed, molded product:

Among voids (formed between the foamed beads fused to constitute the foamed, molded product) observed in the surface of the foamed, molded product, the number of those voids (found per 25 cm² of the surface) which have a size equal to or larger than a half of the size of the foamed bead is counted.

Evaluation is made according to the following criterions:

| Mark | Number of voids | Observations of appearance |
|---|---|---|
| ⊙ | 0–2 | Very excellent |
| ○ | 3–5 | Good |
| Δ | 6–10 | Slightly poor |
| x | 11 or more | Poor |

Figure 3A:
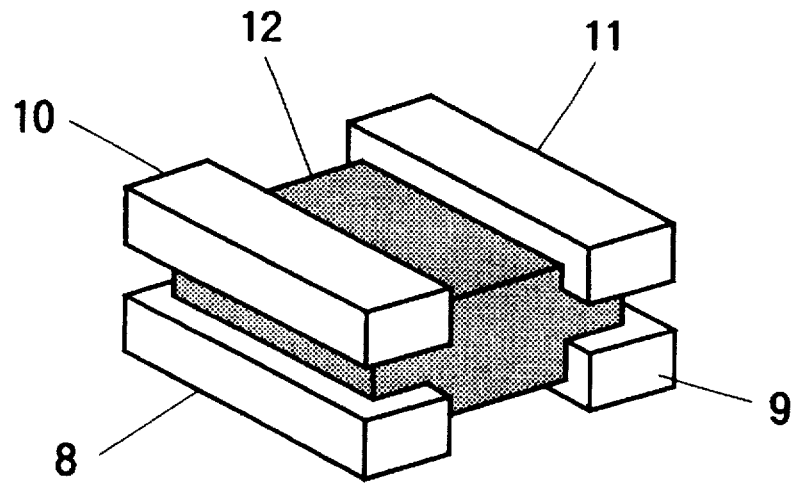
FIG. 3(a) shows a diagrammatic view illustrating the manner of protecting an article with a set of four packings (ultimate foamed, molded products) produced from the expanded foamed beads of the present invention for packaging the article in a container (the article protected and packaged in the container is to be subjected to drop testing)

(9) Drop testing for evaluating the cushioning effect of the ultimate foamed, molded product:

In accordance with JIS-Z-0202, drop testing of packaged freights are conducted. As shown in FIG. 3(a), article 12 is protected with a set of four packings 8, 9, 10 and 11 which are made of foamed, molded products. When the bulk densities of the foamed, molded products are 0.033, 0.018, 0.023 and 0.040 g/cm³, the packings made of these foamed, molded products are used for protecting articles having weights of 30, 10, 20 and 35 kg, respectively. The packings are designed so that the article receives static stresses of 0.08 to 0.12 kg/cm³, respectively, from six faces, i.e., front and back faces, left and right faces and upper and lower faces of the packings.

Figure 3B:
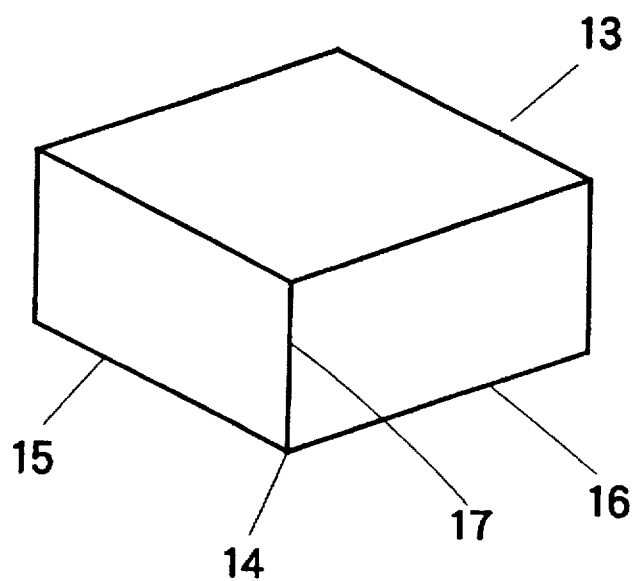
FIG. 3(b) shows a diagrammatic view of the container having the article protected and packaged therein in the manner shown in FIG. 3(a), showing three edges and one corner which will be in collision with a floor in the drop testing).

The article protected by the four packings is accommodated in container 13 [shown in FIG. 3(b)] made of a corrugated board. The container having the article accommodated therein is dropped with corner 14 downward. In this case, packing 8 undergoes the greatest load. Then, the container is dropped one time with each of three edges 15, 16 and 17 downward, that is, dropped three times in total. Subsequently, the container is dropped one time with each of six faces of the container downward, that is, dropped six times in total. Then, the container is opened. The four packings are examined with respect to the degree of damage.

The degree of damage to each of the packings is evaluated by the following five criterions:

a: No cracking;
b: Small cracks occur locally;
c: Medium-sized cracks as large as half the thickness of the packings;
d: Large cracks; and
e: Broken into pieces.

Further, evaluation of the cushioning property of a set of four packings is made according to the following criterions:

| Mark | Evaluation criterions |
|---|---|
| ⊙ | All of 4 packings are evaluated as a, b and/or c, wherein there are 2 or more of a and/or b |
| ○ | Falling outside the above criterion, wherein there are 4 of a, b and/or c |
| Δ | Falling outside the above two criterions, wherein there is at least one d and no e |
| x | Falling outside all of the above three criterions |

(10) Total evaluation:

Based on the evaluations of the retention of foaming agent gas and ratio of closed cells in foamed beads, and the resistance to cracking and number of voids in the surface of foamed, molded products (four evaluation items in total), total evaluation is made according to the following criterions:

| Mark | Evaluation criterions |
|---|---|
| ⊙ | All four items are evaluated as ⊙. |
| ○ | Falling onside the above criterion, wherein all four items are evaluated as ⊙ and/or ○. |
| Δ | Falling outside the above two criterions, wherein all four items are evaluated as ⊙, ○ and/or Δ. |
| x | Falling outside the above three criterions. |

EXAMPLE 1

(1) Preparation of a rubber-modified styrene polymer

A styrene-butadiene block copolymer having a butadiene content of 60 wt % was dissolved in monomeric styrene so that the concentration of the styrene-butadiene block copolymer in the resultant solution became 12 wt %. To 100 parts by weight of the obtained solution were added 5 parts by weight of ethylbenzene, 0.05 part by weight of 1,1-bis(t-butylperoxy)cyclohexane and 0.05 part by weight of t-dodecylmercaptan, to thereby obtain a feed stock for polymerization. The thus obtained feed stock was introduced to a polymerization reactor.

A polymerization reaction was started at 105° C. with stirring, and the reaction was conducted for 3 hours. Then, the temperature was elevated to 130° C., and the reaction was continued for 2 hours. Further, the temperature was elevated to 145° C., and the reaction was continued for 1 hour. The resultant reaction mixture was introduced to a volatilization apparatus which was heated in vacuo, to thereby remove the unreacted styrene and ethylbenzene to obtain a rubber-modified styrene polymer. The obtained polymer was introduced to an extruder having a plurality of dies attached thereto, and then, extruded into strands. The obtained strands were immediately cooled with water, and the cooled strands were cut into pellets. The obtained pellets of the rubber-modified styrene polymer were designated as HIPS-1. The butadiene content of HIPS-1 was calculated from the mass balance of the above-mentioned styrene-butadiene block copolymer and styrene, and found to be 9 wt %.

Then, HIPS-1 and a polystyrene resin were blended in a ratio of 100:30. The obtained blend was subjected to melt kneading by means of a 30 mmø, single screw extruder. The resultant rubber-modified styrene polymer was designated as HIPS-2. The butadiene content of HIPS-2 was calculated from the mass balance of the above-mentioned HIPS-1 and styrene polymer, and found to be 7 wt %.

Further, substantially the same polymerization procedure as used for preparing HIPS-1 was repeated except that the concentration of the styrene-butadiene block copolymer in the solution thereof in styrene was changed to 14.5 wt %, to thereby obtain still another rubber-modified styrene polymer. The obtained rubber-modified styrene polymer was designated as HIPS-3. The butadiene content of HIPS-3 was 10.5%. Each of the butadiene polymer rubber particles which were dispersed in HIPS-1, -2 and -3, had a core-shell structure, and had an average particle diameter of 0.2 μm. The properties, including the intrinsic viscosity ([η]), the swelling index (SWI), of each of HIPS-1, -2 and -3 are shown in Table 1.

(2) Preparation of foamable beads

Foamable beads were prepared using a machine for extrusion and impregnation (hereinafter frequently referred to as "extrusion/impregnation machine"), which has a structure mentioned below.

The extrusion/impregnation machine is equipped with a device for feeding a foaming agent under pressure. The foaming agent-feeding device communicates, through a conduit, to a melt-kneading site of the machine at which melt-kneading of the polymer is to be conducted. The extrusion/impregnation machine is also equipped at a front end portion thereof with a device for cooling an impregnated polymer to an appropriate temperature for extrusion and a number of dies (each having a diameter of 0.7 mm) for extruding an appropriately cooled, impregnated polymer.

HIPS-1 was introduced to the extrusion/impregnation machine at its melt-kneading site and melted therein. 0.13 mol of isopentane (per 100 g of HIPS-1) was fed as a foaming agent from the foaming agent-feeding device to the melt-kneading site of the extrusion/impregnation machine at a constant rate under pressure and kneaded with the molten HIPS-1 therein. The molten mixture of the HIPS-1 with the isopentane was retained in the melt-kneading site at 130° C. for 20 minutes to thereby impregnate HIPS-1 with the isopentane. The resultant molten, isopentane-impregnated polymer was cooled to an appropriate temperature for extrusion by means of the cooling device and then, extruded in water at 60° C. through the above-mentioned extrusion dies, and the extrudate is immediately cut in the water using a rotary cutter to obtain foamable beads having an average diameter of 1.1 mm.

With respect to each of HIPS-2 and -3, foamable beads were obtained in substantially the same manner as in the production of foamable beads from HIPS-1.

(3) Expansion of foamable beads for obtaining expanded foamed beads, and production of ultimate foamed, molded products The foamable beads of each of HIPS-1, -2 and -3 were expanded using a steam-foaming machine in a manner described below.

Steam was charged into the steam-foaming machine to preliminarily heat the inside of the machine. Then, foamable beads were introduced into the steam-foaming machine. Fresh steam was then charged into the machine, so that the air in the machine was purged with the steam over 20 seconds through a purging tube equipped with an orifice and the internal temperature of the machine was elevated to 102° C. over the 20 seconds (gauge pressure: 0.1 kg/cm$^2$G). Thereafter, the temperature was maintained at 102° C. for 17 seconds and then, the steam was purged from the machine, thus obtaining expanded foamed beads. The obtained foamed beads were subjected to aging at 20° C. for 24 hours. Each of the resultant three types of foamed beads prepared, respectively, from HIPS-1, -2 and -3 had an apparent density of 0.033 g/cm$^3$, and these three types of foamed beads had average weights of 0.70 mg, 0.68 mg and 0.69 mg, respectively. The cross-section of the cell wall of the expanded foamed bead was observed by electron microscopy to examine the b/a and a/c ratios, the ratio of closed cells, and the presence of lamellar configuration of rubber particles. In addition, the retention of the foaming agent gas was measured. Results are shown in Table 2.

The above-obtained expanded foamed beads were subjected to molding in a molding die provided in a conventional molding machine for producing a foamed polystyrene to effect fusion-unification with in situ foaming of the beads. Ultimate foamed, molded products were obtained (bulk density: 0.020 g/cm$^3$) having predetermined shapes, which are intended for use as cushion-packings for packing up a 30 kg CRT monitor in a container.

(4) Resistance to cracking and evaluation of appearance (in terms of the number of voids in the surface) with respect to the foamed, molded product The resistance to cracking and the appearance (in terms of the number of voids in the surface) with respect to each of the molded products which were prepared from HIPS-1, -2 and -3, were evaluated and found to be good. Results are shown in Table 2.

EXAMPLE 2

A polybutadiene rubber having a 1,4-cis content of 96 wt % was dissolved in monomeric styrene so that the concentration of the polybutadiene rubber in the resultant solution became 9.5 wt %. To 100 parts by weight of the obtained solution were added 0.04 part by weight of 1,1-bis(t-butylperoxy)cyclohexane and 0.06 part by weight of t-dodecylmercaptan, to thereby obtain a feed stock for polymerization. The thus obtained feed stock was introduced to a polymerization reactor.

A polymerization reaction was started at 110° C. with stirring, and the reaction was conducted for 4 hours. Then, the temperature was elevated to 135° C., and the reaction was continued for 2 hours. Further, the temperature was elevated to 150° C., and the reaction was continued for 2 hours. The resultant reaction mixture was introduced to a volatilization apparatus, in which the mixture was heated in vacuo to thereby remove the unreacted styrene to obtain a rubber-modified styrene polymer. The obtained polymer was designated as HIPS-4. HIPS-4 had a butadiene content of 12.3 wt %, an [η] of 0.80, and an SWI of 9.5. The rubber particles dispersed in the continuous styrene polymer phase of HIPS-4 had a salami structure, and had an average particle diameter of 1.3 μm.

Further, substantially the same polymerization procedure as used for preparing HIPS-4 was repeated except that the concentration of the polybutadiene rubber in the solution thereof in styrene was changed to 5.5 wt %, and that reaction was conducted first at 110° C. for 4 hours, then at 135° C. for 2 hours, and then at 145° C. for 2 hours, to thereby obtain a rubber-modified styrene polymer. The obtained rubber-modified styrene polymer was designated as HIPS-5. The properties of each of HIPS-4 and -5 are shown in Table 1.

Using each of HIPS-4 and -5 individually, foamable beads were prepared in substantially the same manner as in Example 1, except that the retention time of a molten mixture at 130° C. for the impregnation of the polymer with isopentane was changed to 25 minutes.

The thus obtained foamable beads prepared respectively from HIPS-4 and -5 were expanded with foaming and then, subjected to aging in substantially the same manner as in Example 1, to thereby obtain two types of expanded foamed beads each having an apparent density of 0.033 g/cm$^3$. The average weight of each of the obtained two types of foamed beads was 0.75 mg. The properties and appearance of the obtained two types of expanded foamed beads, respectively, obtained from HIPS-4 and -5 were found to be good as shown in Table 2.

The above-obtained expanded foamed beads were subjected to molding in substantially the same manner as in Example 1. Ultimate foamed, molded products were obtained (bulk density: 0.020 g/cm$^3$) having predetermined shapes, which are intended for use as cushion-packings for packing up a 30 kg CRT monitor in a container.

The properties of each of the molded products which were prepared from HIPS-4 and -5 were evaluated and found to be good. Results are shown in Table 2.

EXAMPLE 3

A styrene-butadiene block copolymer having a butadiene content of 60 wt % was dissolved in monomeric styrene so that the concentration of the styrene-butadiene block copolymer in the resultant solution became 12 wt %. Using the resultant solution, a polymerization was carried out in substantially the same manner as in Example 1. The obtained rubber-modified styrene polymer (I) had a butadiene content of 9 wt % and an average particle diameter of 0.2 μm, and the rubber particles dispersed therein had a core-shell structure.

On the other hand, a polybutadiene rubber having a 1,4-cis content of 96 wt % was dissolved in monomeric styrene so that the concentration of the polybutadiene rubber in the resultant solution became 9 wt %. Using the resultant solution, a polymerization was carried out in substantially the same manner as in Example 2. The obtained rubber-modified styrene polymer (II) had a butadiene content of 12 wt % and an average particle diameter of 1.4 μm, and the rubber particles dispersed therein had a salami structure.

The above-obtained rubber-modified styrene polymers (I) and (II) were blended in a ratio of 9:1, and the obtained polymer blend was designated as HIPS-6.

Further, a styrene-butadiene block copolymer having a butadiene content of 60 wt % was dissolved in monomeric styrene so that the concentration of the styrene-butadiene block copolymer in the resultant solution became 10.5 wt %. Using the resultant solution, a polymerization was carried out in substantially the same manner as in Example 1. The obtained rubber-modified styrene polymer (III) had a butadiene content of 8 wt % and an average particle diameter of 0.3 μm, and the rubber particles dispersed therein had a coreshell structure.

On the other hand, a polybutadiene rubber having a 1,4-cis content of 96 wt % was dissolved in monomeric styrene so that the concentration of the polybutadiene rubber in the resultant solution became 6 wt %. Using the resultant solution, a polymerization was carried out in substantially the same manner as in Example 2. The obtained rubber-modified styrene polymer (IV) had a butadiene content of 8 wt % and an average particle diameter of 1.7 μm, and the rubber particles dispersed therein had a salami structure. The obtained rubber-modified styrene polymers (III) and (IV) were blended in a ratio of 8:2, and the obtained polymer blend was designated as HIPS-7.

The properties and appearance of each of HIPS-6 and -7 are shown in Table 1.

Using HIPS-6 and -7 individually, foamable beads, expanded foamed beads and ultimate foamed, molded products were prepared in substantially the same manner as in Example 1. The average weights of the two types of foamed beads prepared from HIPS-6 and -7 were, respectively, 0.64 mg and 0.62 mg. Further, the properties of each of the molded products, which were prepared from HIPS-6 and -7, respectively, were evaluated. Results are found to be good as shown in Table 2.

EXAMPLE 4

Substantially the same procedure as in Example 1 (2) was repeated to obtain foamable beads from HIPS-1 mentioned in Example 1 (1). The obtained foamable beads were expanded in the same manner as in Example 1 (3) except that, after the temperature was elevated to 102° C., the following temperature conditions 1 to 3 were individually employed: condition 1 in which the temperature of 102° C. was maintained for 30 seconds; condition 2 in which the temperature of 102° C. was maintained for 20 seconds; and condition 3 in which the temperature of 102° C. was maintained for 15 seconds. Expanded, foamed beads obtained by using condition 1 above had an apparent density of 0.018 g/cm$^3$, expanded, foamed beads obtained by using condition 2 above had an apparent density of 0.023 g/cm$^3$, and expanded foamed beads obtained by using condition 3 above had an apparent density of 0.040 g/cm$^3$. The foamed beads having an apparent density of 0.018 g/cm$^3$ were subjected to molding by means of the same molding die as used in Example 1, thereby obtaining an ultimate foamed, molded product having a bulk density of 0.11 g/cm$^3$. The foamed beads having an apparent density of 0.023 g/cm$^3$ were subjected to molding in the same manner as described above, thereby obtaining an ultimate foamed, molded product having a bulk density of 0.14 g/cm$^3$. The foamed beads having an apparent density of 0.040 g/cm$^3$ were subjected to molding in the same manner as described above, thereby obtaining an ultimate foamed, molded product having a bulk density of 0.24 g/cm$^3$. With respect to each of the above three types of foamed beads and each of the foamed, molded products obtained therefrom, various properties are shown in Table 3.

EXAMPLE 5

Substantially the same procedure as in Example 4 was repeated except that HIPS-4 was used in place of HIPS-1, thereby obtaining three different types of expanded foamed beads and foamed, molded products corresponding thereto. With respect to each of the three types of foamed beads and each of the corresponding molded products, various properties are shown in Table 3.

Comparative Example 1

Substantially the same polymerization procedure as used for preparing HIPS-1 in Example 1 (1) was repeated except that the amount of t-dodecylmercaptan was changed to 0.09 part by weight as indicated in Table 6 (see "HIPS-8"). The obtained rubber-modified polymer was designated as HIPS-8. HIPS-8 had an [η] value of 0.52 and an SWI of 10.5. Expanded foamed beads and a foamed, molded product corresponding thereto were prepared from the above HIPS-8 in substantially the same manner as in Example 1. The properties of the above-mentioned foamed beads and foamed, molded products are shown in Table 4. With respect to the obtained foamed beads, the ratio b/a was 8, the ratio a/c was 0.06, and the average weight was 0.65 mg. As is apparent from Table 4, the above-obtained foamed beads were poor in the retention of a foaming agent gas. Further, the foamed, molded product obtained therefrom was unsatisfactory in cracking resistance and appearance.

Comparative Example 2

Substantially the same polymerization procedure as used for preparing HIPS-1 in Example 1 (1) was repeated except that the amount of t-dodecylmercaptan was changed to 0.03 part by weight, and the temperature in the third step of the stepwise elevation of temperature was changed to 150° C. as indicated in Table 6 (see "HIPS-9"). The obtained rubber-modified polymer was designated as HIPS-9. HIPS-9 had an [η] value of 0.92 and an SWI of 8.5. Expanded foamed beads and a foamed, molded product corresponding thereto were prepared from the above HIPS-9 in substantially the same manner as in Example 1. The properties of the above-mentioned foamed beads and foamed, molded product are shown in Table 4. With respect to the obtained foamed beads, the ratio b/a was 38, the ratio a/c was 0.02, and the average weight was 0.68 mg. As is apparent from Table 4, the foamed, molded product obtained from the above-obtained foamed beads was unsatisfactory in cracking resistance.

Comparative Example 3

Substantially the same polymerization procedure as used for preparing HIPS-1 in Example 1 (1) was repeated except that the amount of t-dodecylmercaptan was changed to 0.04 part by weight, and temperature and time in the third step of the stepwise elevation of temperature were changed to 150° C. and 3 hours, respectively, as indicated in Table 6 (see "HIPS-10"). The obtained rubber-modified polymer was designated as HIPS-10. HIPS-10 had an [η] value of 0.85 and an SWI of 4.5. Expanded foamed beads and a foamed, molded product corresponding thereto were prepared from the above HIPS-10 in substantially the same manner as in Example 1. The properties of the above-mentioned foamed beads and foamed, molded product are shown in Table 4. With respect to the obtained foamed beads, the ratio b/a was 7, the ratio a/c was 0.06, and the average weight was 0.70 mg. As is apparent from Table 4, the foamed beads were poor in the retention of a foaming agent gas. Further, the foamed, molded product obtained from the above-obtained foamed beads was unsatisfactory in cracking resistance and appearance.

Comparative Example 4

Substantially the same polymerization procedure as used for preparing HIPS-1 in Example 1 (1) was repeated except that the temperature and time in the third step of the stepwise elevation of temperature were changed to 135° C. and 2 hours, respectively, as indicated in Table 6 (see "HIPS-11"). The obtained rubber-modified polymer was designated as HIPS-11. HIPS-11 had an [η] value of 0.62 and an SWI of 14.5. Expanded foamed beads and a foamed, molded product corresponding thereto were prepared from the HIPS-11 in substantially the same manner as in Example 1. The properties of the foamed beads and foamed, molded product are shown in Table 4. With respect to the obtained foamed beads, the ratio b/a was 43, the ratio a/c was 0.02, and the average weight was 0.68 mg. As is apparent from Table 4, the foamed beads were poor in the retention of a foaming agent gas. Further, the foamed, molded product obtained from the above formed beads was unsatisfactory in cracking resistance and appearance.

Comparative Example 5

Using HIPs-1, -4, and -6 individually, substantially the same procedure as in Example 1 (2) and (3) was repeated except that, in Example 1 (2), the retention time in the melt-kneading site at 130° C. was changed to 5 minutes, to thereby obtain expanded foamed beads and a foamed, molded product. The properties of the above-mentioned foamed beads and foamed, molded product are shown in Table 4. With respect to the three types of foamed beads obtained from HIPS-1, -4, and -6, the ratios b/a were, 7, 6 and 7, respectively; the ratios a/c were 0.04, 0.08 and 0.04, respectively; and the average weights were 0.70 mg, 0.69 mg and 0.70 mg, respectively. As is apparent from Table 4, the above-obtained foamed beads and the foamed, molded products were relatively poor in properties.

Comparative Example 6

Substantially the same polymerization procedure as used for preparing HIPS-1 in Example 1 (1) was repeated except that the rubber concentration of a styrene solution of rubber was changed to 8.5% by weight, that the amounts of ethylbenzene and 1,1-bis(t-butylperoxy)cyclohexane were, respectively, changed to 15 parts by weight and 0.06 part by weight, and that the temperature and time in the third step of the stepwise elevation of temperature were changed to 140° C. and 3 hours as indicated in Table 6 (see "HIPS-12"). The obtained polymer was designated as HIPS-12. HIPS-12 had an average diameter of rubber particles of 0.12 μm. Expanded foamed beads and a foamed, molded product were prepared from the above HIPS-12 in substantially the same manner as in Example 1. The properties of the obtained expanded foamed beads and foamed, molded product are shown in Table 5. With respect to the obtained expanded foamed beads, the ratio b/a was 35, the ratio a/c was 0.009, and the average weight was 0.70 mg. As is apparent from Table 5, the molded product obtained from the above expanded foamed beads was unsatisfactory in cracking resistance.

Comparative Example 7

Substantially the same polymerization procedure as used for preparing HIPS-4 in Example 2 was repeated except that the rubber concentration of a styrene solution of rubber was changed to 7.5% by weight; that the amounts of 1,1-bis(t-butylperoxy)cyclohexane and t-dodecylmercaptan were, respectively, changed to 0.05 part by weight and 0.04 part by weight; and that the time in the third step of the stepwise elevation of temperature was changed to 3 hours as indicated in Table 6 (see "HIPS-13"). The obtained polymer was designated as HIPS-13. HIPS-13 had an average diameter of rubber particles of 3.3 μm. Expanded foamed beads and a foamed, molded product were prepared from the above HIPS-13 in substantially the same manner as in Example 1. The properties of the above-obtained expanded foamed beads and foamed, molded product are shown in Table 5. With respect to the obtained foamed beads, the ratio b/a was 18, the ratio a/c was 0.21, and the average weight was 0.75 mg. As is apparent from Table 5, the above-obtained foamed beads were poor in the retention of a foaming agent gas and the ratio of closed cells. Further, the foamed, molded product obtained from the above foamed beads was unsatisfactory in cracking resistance and appearance.

Comparative Example 8

Substantially the same procedure as used for preparing HIPS-2 in Example 1 (1) was repeated except that the ratio of HIPS-1 to a polystyrene resin was changed to 100:200. The resultant rubber-modified styrene polymer was designated as HIPS-14. The butadiene content of HIPS-14 was calculated from the mass balance of the HIPS-1 and styrene polymer, and found to be 3 wt %. Expanded foamed beads and a molded product were prepared from the above HIPS-14 in substantially the same manner as in Example 1. The properties of the obtained expanded foamed beads and foamed, molded product are shown in Table 5. With respect to the obtained foamed beads, the ratio b/a was 16, the ratio a/c was 0.04, and the average weight was 0.66 mg. As is apparent from Table 5, in the above foamed beads, the rubber particles are not dispersed in a lamellar configuration in the cross-section of the cell wall. The molded product obtained therefrom was unsatisfactory in cracking resistance.

Comparative Example 9

Substantially the same procedure as in Example 4 was repeated except that HIPS-10 was used in place of HIPS-1, thereby obtaining three types of foamed beads having apparent densities of 0.018 g/cm³, 0.023 g/cm³ and 0.040 g/cm³, respectively. These three types of foamed beads were subjected to molding in substantially the same manner as in Example 4, thereby obtaining three types of molded products having bulk densities of 0.11 g/cm³, 0.14 g/cm³ and 0.24 g/cm³, respectively.

With respect the above three types of foamed beads, the ratios b/a were, respectively, 9, 8 and 7; and the ratios a/c were, respectively, 0.21, 0.15 and 0.15. As is apparent from Table 5, the molded products produced from these three types of foamed beads were poor in properties.

INDUSTRIAL APPLICABILITY

The expanded foamed bead of a rubber-modified stylene polymer of the present invention can be used for producing a molded product which is excellent in cracking resistance. The molded product can be advantageously used as a cushioning material in packaging an article having a relatively large weight which is likely to be repeatedly subjected to a jolt or impact during transportation. Further, due to the excellent resistance to cracking, the amount of the cushioning material to be used can be reduced, so that the volume of the packaged article is reduced, thus improving the efficiency of the transportation. Further, a molded product produced from the expanded foamed bead of the present invention is excellent also in flexibility, so that it can also be advantageously used as, for example, a heat insulating material for use in, for example, houses and various types of baths. Further, the expanded foamed bead of a rubber-modified styrene polymer of the present invention is excellent in the retention of a foaming gas and, therefore, exhibits a high expanding capability, so that a molded product produced therefrom is excellent in appearance.

Further, the expanded foamed bead of the present invention and a molded product thereof are advantageous in that they can readily be produced at a relatively low cost by the use of customary equipment. In addition, when a molded product produced from the foamed bead of the present invention is melted together with a molded product produced from conventional foamed beads, the miscibility therebetween is good, and the resultant polymer blend can be pelletized for further use. As apparent from the above, the expanded foamed bead of a rubber-modified styrene polymer of the present invention is extremely useful in fields relating to foamed, molded products of expanded foamed beads.

TABLE 1

| Rubber-modified styrene polymer No. | Intrinsic viscosity of continuous styrene polymer phase [η] | Swelling index of gel moiety | Structure of rubber particles | Average diameter of rubber particles (μm) | Butadiene content of rubber-modified styrene polymer (wt %) |
|---|---|---|---|---|---|
| Examples | | | | | |
| HIPS-1 | 0.68 | 10 | core-shell | 0.2 | 9.0 |
| HIPS-2 | 0.82 | 8.5 | core-shell | 0.2 | 7.0 |
| HIPS-3 | 0.69 | 11.5 | core-shell | 0.2 | 10.5 |
| HIPS-4 | 0.80 | 9.5 | salami | 1.3 | 12.3 |
| HIPS-5 | 0.83 | 9.0 | salami | 2.1 | 7.5 |
| HIPS-6 | 0.65 | 8.5 | core-shell/salami | 0.3 | 9.2 |
| HIPS-7 | 0.77 | 6.5 | core-shell/salami | 0.4 | 8.0 |
| Comparative Examples | | | | | |
| HIPS-8 | 0.52 | 10.5 | core-shell | 0.2 | 9.0 |

TABLE 1-continued

| Rubber-modified styrene polymer No. | Intrinsic viscosity of continuous styrene polymer phase [η] | Swelling index of gel moiety | Structure of rubber particles | Average diameter of rubber particles (μm) | Butadiene content of rubber-modified styrene polymer (wt %) |
|---|---|---|---|---|---|
| HIPS-9 | 0.92 | 8.5 | core-shell | 0.2 | 9.0 |
| HIPS-10 | 0.85 | 4.5 | core-shell | 0.2 | 9.0 |
| HIPS-11 | 0.62 | 14.5 | core-shell | 0.2 | 9.0 |
| HIPS-12 | 0.63 | 12.5 | core-shell | 0.12 | 6.5 |
| HIPS-13 | 0.65 | 9.0 | salami | 3.3 | 10 |
| HIPS-14 | 0.84 | 8.5 | core-shell | 0.2 | 3.0 |

TABLE 2

| | | Foamed bead | | | | | Properties | | | |
|---|---|---|---|---|---|---|---|---|---|---|
| | | | Cross-section of cell wall | | | Foamed bead | | Foamed, molded product | | |
| | HIPS No. | Apparent density (g/cm³) | b/a | a/c | Lamellar configuration of rubber particles | Retention of foaming agent gas (hrs) | Ratio of closed cells (%) | Resistance to cracking | Number of voids in surface | Total evaluation |
| Example 1 | 1 | 0.033 | 15 | 0.04 | present | 120 ⊙ | 92 ⊙ | cbbb ⊙ | 1 ⊙ | ⊙ |
| | 2 | 0.033 | 16 | 0.04 | present | 140 ⊙ | 94 ⊙ | ccbb ⊙ | 1 ⊙ | ⊙ |
| | 3 | 0.033 | 16 | 0.04 | present | 100 ⊙ | 90 ⊙ | ccbb ⊙ | 2 ⊙ | ⊙ |
| Example 2 | 4 | 0.033 | 14 | 0.10 | present | 80 ⊙ | 92 | ccbb ⊙ | 4 | ○ |
| | 5 | 0.033 | 14 | 0.12 | present | 75 ○ | 91 ⊙ | cccc ○ | 5 ○ | ○ |
| Example 3 | 6 | 0.033 | 16 | 0.05 | present | 100 ⊙ | 93 ⊙ | ccbb ⊙ | 2 ⊙ | ⊙ |
| | 7 | 0.033 | 12 | 0.08 | present | 100 ⊙ | 90 ⊙ | ccbb ⊙ | 2 ⊙ | ⊙ |

TABLE 3

| | | Foamed bead | | | | | Properties | | | |
|---|---|---|---|---|---|---|---|---|---|---|
| | | | Cross-section of cell wall | | | Foamed bead | | Foamed, molded product | | |
| | HIPS No. | Apparent density (g/cm³) | b/a | a/c | Lamellar configuration of rubber particles | Retention of foaming agent gas (hrs) | Ratio of closed cells (%) | Resistance to cracking | Number of voids in surface | Total evaluation |
| Example 4 | 1 | 0.018 | 31 | 0.05 | present | 100 ⊙ | 90 ⊙ | cccc ○ | 5 ○ | ○ |
| | 1 | 0.023 | 26 | 0.05 | present | 110 ⊙ | 92 ⊙ | cccb ○ | 4 ○ | ○ |
| | 1 | 0.040 | 12 | 0.04 | present | 120 ⊙ | 95 ⊙ | bbbb ⊙ | 1 ⊙ | ⊙ |
| Example 5 | 4 | 0.018 | 28 | 0.18 | present | 90 ○ | 80 △ | cccc ○ | 8 △ | △ |
| | 4 | 0.023 | 18 | 0.14 | present | 100 ⊙ | 85 ○ | cccb ○ | 6 △ | △ |
| | 4 | 0.040 | 12 | 0.09 | present | 110 ⊙ | 95 ⊙ | bbbb ⊙ | 2 ⊙ | ⊙ |

TABLE 4

| | HIPS No. | Apparent density (g/cm³) | Cross-section of cell wall b/a | Cross-section of cell wall a/c | Lamellar configuration of rubber particles | Foamed bead Retention of foaming agent gas (hrs) | Foamed bead Ratio of closed cells (%) | Foamed, molded product Resistance to cracking | Foamed, molded product Number of voids in surface | Total evaluation |
|---|---|---|---|---|---|---|---|---|---|---|
| Comparative Example 1 | 8 | 0.033 | 8 | 0.06 | present | 60 Δ | 88 ○ | eddc x | 7 Δ | x |
| Comparative Example 2 | 9 | 0.033 | 38 | 0.02 | present | 80 ○ | 92 ⊙ | dddd Δ | 5 ○ | Δ |
| Comparative Example 3 | 10 | 0.033 | 7 | 0.06 | present | 55 x | 87 ○ | eddc x | 8 Δ | x |
| Comparative Example 4 | 11 | 0.033 | 43 | 0.02 | present | 60 Δ | 85 Δ | dddd Δ | 9 Δ | Δ |
| Comparative Example 5 | 1 | 0.033 | 7 | 0.04 | present | 70 Δ | 90 ⊙ | ccdd Δ | 4 ○ | Δ |
| | 4 | 0.033 | 6 | 0.08 | present | 60 Δ | 88 ○ | dddd Δ | 8 Δ | Δ |
| | 6 | 0.033 | 7 | 0.04 | present | 65 Δ | 90 ⊙ | ccdd Δ | 4 ○ | Δ |

TABLE 5

| | HIPS No. | Apparent density (g/cm³) | Cross-section of cell wall b/a | Cross-section of cell wall a/c | Lamellar configuration of rubber particles | Foamed bead Retention of foaming agent gas (hrs) | Foamed bead Ratio of closed cells (%) | Foamed, molded product Resistance to cracking | Foamed, molded product Number of voids in surface | Total evaluation |
|---|---|---|---|---|---|---|---|---|---|---|
| Comparative Example 6 | 12 | 0.033 | 35 | 0.009 | present | 100 ⊙ | 92 ⊙ | eddd x | 5 ○ | x |
| Comparative Example 7 | 13 | 0.033 | 18 | 0.21 | present | 60 Δ | 78 x | eddd x | 11 x | x |
| Comparative Example 8 | 14 | 0.033 | 16 | 0.04 | not present | 120 ⊙ | 94 ⊙ | eedd x | 3 ○ | x |
| Comparative Example 9 | 10 | 0.018 | 9 | 0.21 | present | 65 Δ | 82 Δ | ddcc Δ | 12 x | x |
| | 10 | 0.023 | 8 | 0.15 | present | 70 Δ | 84 Δ | ddcc Δ | 8 Δ | Δ |
| | 10 | 0.040 | 7 | 0.15 | present | 80 ○ | 92 ⊙ | cccc ○ | 5 ○ | ○ |

TABLE 6

| | Formulation of feed stock for polymerization | | | | |
|---|---|---|---|---|---|
| | Rubber concentration of styrene solution of rubber | Ethylbenzene | 1,1-bis(t-butylperoxy)-cyclohexane | t-dodecyl-mercaptan | Polymerization conditions Stepwise elevation of temperature and time |
| Styrene-butadiene rubber | | | | | |
| HIPS-1 | 12% by weight | 5 parts by weight | 0.05 part by weight | 0.05 part by weight | (1): 105° C. × 3 hrs (2): 130° C. × 2 hrs (3): 145° C. × 1 hr |
| HIPS-2* | 12% by weight | 5 parts by weight | 0.05 part by weight | 0.05 part by weight | (1): Same as (1) for HIPS-1 (2): Same as (2) for HIPS-1 (3): Same as (3) for HIPS-1 |
| HIPS-3 | 14.5% by weight | 5 parts by weight | 0.05 part by weight | 0.05 part by weight | (1): Same as (1) for HIPS-1 (2): Same as (2) for HIPS-1 (3): Same as (3) for HIPS-1 |
| HIPS-(I) | 12% by weight | 5 parts | 0.05 part | 0.05 part | (1): Same as (1) for HIPS-1 |

TABLE 6-continued

| | Formulation of feed stock for polymerization | | | | |
|---|---|---|---|---|---|
| | Rubber concentration of styrene solution of rubber | Ethylbenzene | 1,1-bis(t-butylperoxy)cyclohexane | t-dodecylmercaptan | Polymerization conditions Stepwise elevation of temperature and time |
| (for HIPS-6) | | by weight | by weight | by weight | (2): Same as (2) for HIPS-1<br>(3): 150° C. × 1 hr |
| HIPS-(III) (for HIPS-7) | 10.5% by weight | 5 parts by weight | 0.05 part by weight | 0.04 part by weight | (1): Same as (1) for HIPS-1<br>(2): Same as (2) for HIPS-1<br>(3): 150° C. × 2 hrs |
| HIPS-8 | 12% by weight | 5 parts by weight | 0.05 part by weight | 0.09 part by weight | (1): Same as (1) for HIPS-1<br>(2): Same as (2) for HIPS-1<br>(3): Same as (3) for HIPS-1 |
| HIPS-9 | 12% by weight | 5 parts by weight | 0.05 part by weight | 0.03 part by weight | (1): Same as (1) for HIPS-1<br>(2): Same as (2) for HIPS-1<br>(3): 150° C. × 1 hr |
| HIPS-10 | 12% by weight | 5 parts by weight | 0.05 part by weight | 0.04 part by weight | (1): Same as (1) for HIPS-1<br>(2): Same as (2) for HIPS-1<br>(3): 150° C. × 3 hrs |
| HIPS-11 | 12% by weight | 5 parts by weight | 0.05 part by weight | 0.05 part by weight | (1): Same as (1) for HIPS-1<br>(2): Same as (2) for HIPS-1<br>(3): 135° C. × 2 hrs |
| HIPS-12 | 8.5% by weight | 15 parts by weight | 0.06 part by weight | 0.05 part by weight | (1): Same as (1) for HIPS-1<br>(2): Same as (2) for HIPS-1<br>(3): 140° C. × 3 hrs |
| HIPS-14** | 12% by weight | 5 parts by weight | 0.05 part by weight | 0.05 part by weight | (1): Same as (1) for HIPS-1<br>(2): Same as (2) for HIPS-1<br>(3): Same as (3) for HIPS-1 |
| Polybutadiene rubber | | | | | |
| HIPS-4 | 9.5% by weight | 0 | 0.04 part by weight | 0.06 part by weight | (1): 110° C. × 4 hrs<br>(2): 135° C. × 2 hrs<br>(3): 150° C. × 2 hrs |
| HIPS-5 | 5.5% by weight | 0 | 0.04 part by weight | 0.06 part by weight | (1): 105° C. × 6 hrs<br>(2): 130° C. × 2 hrs<br>(3): 150° C. × 3 hrs |
| HIPS-(II) (for HIPS-6) | 9% by weight | 0 | 0.04 part by weight | 0.04 part by weight | (1): Same as (1) for HIPS-4<br>(2): Same as (2) for HIPS-4<br>(3): 150° C. × 3 hrs |
| HIPS-(IV) (for HIPS-7) | 6% by weight | 0 | 0.05 part by weight | 0.05 part by weight | (1): Same as (1) for HIPS-4<br>(2): Same as (2) for HIPS-4<br>(3): 155° C. × 3 hrs |
| HIPS-13 | 7.5% by weight | 0 | 0.05 part by weight | 0.04 part by weight | (1): Same as (1) for HIPS-4<br>(2): Same as (2) for HIPS-4<br>(3): 150° C. × 3 hrs |

Note) The "parts by weight" indicated for ethylbenzene, 1,1-bis(t-butylperoxy)cyclohexane and t-dodecylmercaptan are relative to 100 parts by weight of the styrene solution of rubber.
*HIPS-2 was actually prepared by melt-kneading HIPS-1 and a polystyrene resin blended in a ratio of 100:30 in Example 1.
**HIPS-14 was actually prepared by melt-kneading HIPS-1 and a polystyrene resin blended in a ratio of 100:200 in Comparative Example 8.

We claim:

1. A process for producing an expanded foamed bead of a rubber-modified styrene polymer comprising a plurality of closed cells defined by cell walls which constitute a matrix for said bead, each of said cell walls comprising two surfaces separated by a distance equal to the thickness of said cell wall, said matrix comprising:
(a) a continuous styrene polymer phase; and
(b) a rubber phase dispersed in said continuous styrene polymer phase (a), comprising a plurality of substantially flat, butadiene polymer rubber particles each having at least one styrene polymer particle occluded therein;

wherein said flat rubber particles are arranged in lamellar configuration along the thickness of said cell wall and are oriented so that the long axis of a cross-section of each flat rubber particle, as viewed in a cross-section of said cell wall, taken along the thickness of said cell wall, is substantially parallel to the two surfaces of said cell wall, and wherein the cell wall and each flat rubber particle satisfy the formulae I and II:

$$0.01 \leq a/c \leq 0.2 \quad (I),$$

and $$10 \leq b/a \leq 70 \quad (II)$$

wherein a represents the thickness (μm) of the rubber particle as measured in terms of the length of the short axis of said cross-section of the rubber particle; b represents the diameter (μm) of the rubber particle as measured in terms of the length of said long axis of said cross-section of the rubber particle, and c represents the thickness (μm) of said cross-section of the cell wall, said process comprising:
(1) melt-kneading a rubber-modified styrene polymer with a foaming agent in an extruder to form a molten mixture therein, said rubber-modified styrene polymer comprising:
(a) a continuous styrene polymer phase; and
(b) a rubber phase dispersed in said continuous styrene polymer phase (a) and comprising a plurality of butandiene polymer rubber particles each having at least one styrene polymer particle occluded therein, wherein said continuous styrene polymer phase (a) has an intrinsic viscosity of from 0.6 to 0.9 occluded therein;

wherein said flat rubber particles are arranged in lamellar configuration along the thickness of said cell wall and are oriented so that the long axis of a cross-section of each flat rubber particle, as viewed in a cross-section of said cell wall, taken along the thickness of said cell wall, is substantially parallel to the two surfaces of said cell wall, and wherein the cell wall and each flat rubber particle satisfy the formulae I and II:

$$0.01 \leq a/c \leq 0.2 \tag{I}$$

and $$10 \leq b/a \leq 70 \tag{II}$$

wherein a represents the thickness (μm) of the rubber particle as measured in terms of the length of the short axis of said cross-section of the rubber particle; b represents the diameter (μm) of the rubber particle as measured in terms of the length of said long axis of said cross-section of the rubber particle, and c represents the thickness (μm) of said cross-section of the cell wall, said process comprising:
(1) melt-kneading a rubber-modified styrene polymer with a foaming agent in an extruder to form a molten mixture therein, said rubber-modified styrene polymer comprising:
(a) a continuous styrene polymer phase; and
(b) a rubber phase dispersed in said continuous styrene polymer phase (a) and comprising a plurality of butadiene polymer rubber particles each having at least one styrene polymer particle occluded therein, wherein said continuous styrene polymer phase (a) has an intrinsic viscosity of from 0.6 to 0.9 dl/g as measured in toluene at 30° C., and said rubber-modified styrene polymer has a gel moiety with a swelling index of from 6.5 to 13.5, said gel moiety being defined as an extraction residue of the extraction of said rubber-modified styrene polymer with toluene at 25° C., said swelling index of the gel moiety being defined as a value (B) obtained according to the formula III:

$$B = 100 \cdot (W_1 - W_2)/W_2 \tag{III}$$

wherein $W_1$ represents the weight of the gel moiety swelled with toluene at 25° C., and $W_2$ represents the weight of the gel moiety obtained by drying said swelled gel moiety, (2) retaining said molten mixture at 130° C. or higher for 15 minutes or more under a pressure of from 50 to 300 kg/cm²G in said extruder to thereby impregnate said rubber-modified styrenes polymer with said foaming agent, (3) extruding the resultant molten, impregnated rubber-modified styrene polymer into water, followed by cutting of the extruded polymer, and (4) heating the cut, impregnated rubber-modified styrene polymer.

2. The process according to claim 1, wherein said heating at step (4) is conducted at 95° to 104° C. for 10 to 150 seconds.

* * * * *

UNITED STATES PATENT AND TRADEMARK OFFICE
CERTIFICATE OF CORRECTION

PATENT NO.:   5,525,639
DATED     :   June 11, 1996
INVENTOR(S):  Masamichi KANEKO et al It is certified that errors appear in the above-identified patent and that said Letters Patent is hereby corrected as shown below:

Cover page, item [19], correct name of first-named inventor to --KANEKO--.

Cover page, item [75], correct first-named inventor's name to --Masamichi KANEKO--.

Signed and Sealed this

Eleventh Day of February, 1997

Attest:

BRUCE LEHMAN

*Attesting Officer*            *Commissioner of Patents and Trademarks*

UNITED STATES PATENT AND TRADEMARK OFFICE
CERTIFICATE OF CORRECTION

PATENT NO. : 5,525,639
DATED : June 11, 1996
INVENTOR(S) : Masamichi KANEKO et al It is certified that error appears in the above-indentified patent and that said Letters Patent is hereby corrected as shown below:

Column 34, line 17, "$B = 100 \cdot (W_1 - W_2)/W_2$" should read -- $B = (W_1 - W_2)/W_2$ --.

Signed and Sealed this

Second Day of September, 1997

Attest:

BRUCE LEHMAN

Attesting Officer

Commissioner of Patents and Trademarks